United States Patent [19]

Sugawara et al.

[11] Patent Number: 5,202,898
[45] Date of Patent: Apr. 13, 1993

[54] LASER OSCILLATOR, LASER RESONATOR, AND APPARATUS FOR MANUFACTURING OF SEMICONDUCTOR

[75] Inventors: Hiroyuki Sugawara, Hitachi; Toshiharu Shirakura, Toukai; Takeshi Yamamura; Hideki Yamai, both of Hitachi, all of Japan

[73] Assignees: Hitachi, Ltd., Tokyo; Hitachi Engineering Co., Ltd., Ibataki, both of Japan

[21] Appl. No.: 733,646

[22] Filed: Jul. 22, 1991

[30] Foreign Application Priority Data

Sep. 19, 1990 [JP] Japan .................................. 2-247587

[51] Int. Cl.$^5$ ................................................ H01S 3/08
[52] U.S. Cl. ........................................ 372/92; 372/99; 372/101; 372/108
[58] Field of Search ................... 372/9, 29, 50, 92, 99, 372/101, 103, 108; 437/51, 36, 80, 129, 141, 147, 148

[56] References Cited

U.S. PATENT DOCUMENTS

| | | | |
|---|---|---|---|
| 3,537,028 | 10/1970 | Pankove | 372/92 |
| 4,551,684 | 11/1985 | Bernhardt | 372/93 X |
| 4,649,544 | 3/1987 | Haas et al. | 372/99 |
| 4,715,040 | 12/1987 | Lee | 372/92 |
| 4,745,618 | 5/1988 | Burger | 372/92 |
| 4,803,694 | 2/1989 | Lee et al. | 372/98 X |
| 4,998,256 | 3/1991 | Ohshima et al. | 372/92 |
| 5,079,772 | 1/1992 | Negus et al. | 372/92 |
| 5,097,476 | 3/1992 | Thiessen | 372/92 |
| 5,101,415 | 3/1992 | Kolb et al. | 372/99 |
| 5,125,001 | 6/1992 | Yagi et al. | 372/99 X |

FOREIGN PATENT DOCUMENTS

| | | | |
|---|---|---|---|
| 1439416 | 11/1968 | Fed. Rep. of Germany | 372/92 X |
| 61-163681 | 7/1986 | Japan | 372/92 X |
| 62-49263 | 3/1987 | Japan | 372/92 X |
| 1017076 | 1/1966 | United Kingdom | 372/92 X |

OTHER PUBLICATIONS

Patent Abstracts of Japan (JP-A-59 147477) vol. 8, No. 277 (E-285) Aug. 1984.
Patent Abstracts of Japan (JP-A-2170585) vol. 14, No. 437 (E-98) Jul. 1990.
Patent Abstracts of Japan (JP-A-1011326) vol. 13, No. 186 (E-752) Jan. 1989.
Bhatnagar et al., "Performance of a copper vapor laser ..." Optics Comm. vol. 74, No. $\frac{1}{2}$ pp. 93–96.
Singh et al., "Effect of Intracavity Spatial Filtering ..." J. of Applied Physics vol. 69, No. 1 Jan. 1991, pp. 537–538.

*Primary Examiner*—Brian Healy
*Attorney, Agent, or Firm*—Antonelli, Terry, Stout & Kraus

[57] ABSTRACT

The present invention relates to a laser oscillator, especially to a laser oscillator suitable for ultrafine manufacturing such as an apparatus for manufacturing of a semiconductor wherein the laser oscillator is provided with constant directivity chronically, although the directivity is not so fine, for avoiding a blurred image spatially and chronically in order to obtain a stable mask in the ultrafine manufacturing. The laser oscillator includes apparatus for enabling at least one of selection of the directivity of parallel light from a resonator between a whole reflector and a laser medium; an optical system for stopping oscillation of the laser medium before a laser beam, which is generated at the resonator, becomes a single mode and for eliminating the laser beam having poor directivity; prevention of the laser medium from re-entry of unnecessary natural emitting light which is generated in the laser medium; and providing a value of a diameter of an aperture of the optical system for maintaining directivity so as to make an order number of the transverse mode high.

19 Claims, 4 Drawing Sheets

DIAMETER OF THE PIN HOLE IN THE RESONATOR 1.5mm

DIAMETER OF THE PIN HOLE IN THE RESONATOR 1.0mm

DIAMETER OF THE PIN HOLE IN THE RESONATOR 0.6mm

LASER OSCILLATOR, LASER RESONATOR, AND APPARATUS FOR MANUFACTURING OF SEMICONDUCTOR

BACKGROUND OF THE INVENTION

The present invention relates to a laser oscillator, especially to the laser oscillator suitable for ultrafine manufacturing such as an apparatus for manufacturing of semiconductor.

A miniaturized or enlarged figure of a drawing which is drawn on a mask is depicted on an image forming plane by transmitting the mask with light and focusing the image of the drawing of the mask on the image forming plane with a lens etc.

A laser is used as a light source of the process described above, and the process is utilized for ultrafine fabrication etc. As of the laser oscillator for the utilization, there are some which are disclosed in Japanese Patent Laid-Open No. 61-163681 (1986) (prior art 1) and Japanese Utility Model Laid-Open No. 62-49263 (1987) (prior art 2).

For avoiding a blurred image spatially and chronically in order to obtain stable focusing image on the mask in ultrafine fabrication, it is necessary to have a constant directivity chronically and no interference even though the directivity is poor.

Both of the prior arts described above are aimed to form laser having good directivity. The prior art 1 is for eliminating of light having poor directivity from output light with light collecting elements and an aperture mechanism for making the output light have good directivity. The prior art has a problem of low efficiency.

On the other hand, in the prior art 2, two light collecting elements and an aperture mechanism are installed at a confocal position between the laser medium which emits the laser continuously and the output mirror. As generating the laser light continuously, it is possible to have a constant directivity chronically, but because of forming a single mode (strength distribution like single Gauss distribution) wherein the number of strongness and weakness in strength of the beam (which is called as the order number of lateral mode) which is generated at a vertical cross section of light being formed in the oscillator is single, interference is strong and a stripe pattern is formed, and a problem that strength of the image is not uniform spatially is caused.

SUMMARY OF THE INVENTION

The first object of the present invention is to provide a laser oscillator which generates a laser beam having almost constant directivity chronically.

The second object of the present invention is to provide a laser oscillator which is preferable for emitting beams which have relatively uniform strength spatially.

The third object of the present invention is to provide a laser oscillator which is preferable for effective generation of a laser beam having almost constant directivity chronically.

The fourth object of the present invention is to provide a laser oscillator which is preferable for generating of a laser beam having almost constant directivity chronically and very short length of pulse such as an excimer laser, a copper vapor laser, and a dye laser which is excited by the lasers described above.

The first object of the present invention is achieved by a means to stop the laser light generation before the laser beam which is formed in the oscillator becomes single mode and installing of an optical system which eliminates the laser beam having poor directivity.

The second object of the present invention is achieved by making the diameter of an aperture in the optical system for giving directivity have a value which provides a higher order transverse mode.

The third object of the present invention is achieved by installing a means to prevent the unnecessary light which is emitted spontaneously from the laser medium from re-entering into the laser medium.

The fourth object of the present invention is achieved by installing an optical system which eliminates the beam having poor directivity between the laser medium and a whole reflecting mirror in the laser having objects described above.

First, the means to achieve the first and the fourth objects is explained.

A laser comes to have preferable directivity gradually after repeating back and forth reflection for several times in the resonator as the first released light from the laser medium becomes a source. Laser light repeats the back and forth reflection for many times as large as close to infinity in a conventional laser which generates the beam continuously, hence the light repeats the back and forth reflection in the resonator for enough times to form the low order lateral mode such as a single mode having preferable directivity is formed. Such a laser has strong interference.

The laser light of single mode has a beam divergence angle of $\lambda/\pi a$ where, $\lambda$ is the wave length, and a is the radius of the laser light in the resonator. For instance, in the case of carbon dioxide gas laser having a radius of 10mm, the angle is 0.34 mrad by half angle. The value is equivalent to the divergence angle of the beam passing through a circular opening having a radius of 10 mm which is provided at a place apart from the point light source by nearly 30 m. Therefore, although the situation may change depending on the radius of curvature of the resonator, roughly speaking, the laser beam comes to have preferable interference after reflecting back and forth in a distance of about 30 m in the resonator from the beginning of excitation. The time needed is as extremely short as about 100 ns (1 ns is $10^{-9}$ second). In the specification of the present invention, the time which is needed for formation of single mode is called the single mode forming time hereinafter. The time is expressed by the equation of $\pi a^2/\lambda c$ where, c is the velocity of light.

On the other hand, the directivity of the beam changes chronically because the light comes gradually to have preferable directivity by repeating of back and forth reflection during the time. Therefore, with continuous laser oscillators such as a carbon dioxide gas laser and pulse laser oscillators oscillating for more than the single mode forming time, the oscillation is terminated before the single mode forming time in the present invention. As the result, laser light having different directivity coexist together in the resonator. But, in cases of an excimer laser, a copper vapor laser, and a dye laser which is excited by the lasers described above, the condition described above is not necessary because the lasers have shorter oscillating time than the single mode forming time. Using of only a laser before reaching the single mode forming time means using of a laser before being stabilized in directivity, hence directivity of the laser changes chronically. The preferable directivity is kept by elimination of beams having poor directivity, which are generated at beginning of the oscillating etc.

Next, the means to achieve the second object of the present invention is described.

First, the order of transverse mode and distribution of strength are learned. As the higher the order of transverse mode is, the flatter the distribution of strength at the plane where the lateral mode is formed becomes. For instance, in the case of single mode, the distribution has Gaussian distribution with a peak. In the case that the order of lateral mode is four, four peaks having lower values than that of single mode are generated at up and down, and left and right positions of a circular plane. Therefore, the order of lateral mode may be increased for obtaining the required flat distribution of strength. For instance, if an optical system of which directivity is regulated with two light collecting elements and a diaphragm mechanism which is installed at their confocal position, the order of the lateral mode is increased as the diameter of the diaphragm is increased, hence selection of the diameter of the diaphragm properly enable the distribution of strength to be flat.

Finally, the means to achieve the third object is explained.

When voltage is charged to a laser medium, spontaneously emitted light which is corresponding to the exciting level of the laser medium is generated. Among the spontaneously emitted lights, only the light which reflects back and forth between the whole reflecting mirror and the output mirror is used as an output light. During the reflection of back and forth, the energy of the emitted light is amplified by addition of energy from the laser having the same exciting level as the stimulatively emitted light. This is called a stimulated emission. If spontaneously emitted light which is not preferable for the output light re-enters into the laser medium, it is also amplified. Accordingly, the more unnecessary spontaneous light is reflected to the laser medium, the worse the efficiency becomes by lowering of the ratio of energy addition to the output light in the laser medium. For instance, in the case of the carbon dioxide gas laser having a resonator of 1.5 m long, the oscillation has to be terminated by 10 back and forth reflections. On the other hand, the spontaneous emitted light is as extremely weak as the order of $10^{-12} W/cm^2$, and amplification of the light to kW order in 10 back and forth reflections requires amplification of 100 times per one reflection of back and forth. Usually, the carbon dioxide gas laser has an amplifying factor of only about 2. This means that a laser having extremely larger amplifying factor becomes necessary. The inventors observed experimentally that the spontaneously emitted light which are emitted always in all directions from the laser medium exist with the laser such as the one described above, and without making the spontaneously emitted light not return to the laser medium for preventing the light from being amplified, the excited energy is consumed in amplifying of the spontaneously emitted light and the efficiency becomes extremely low.

Therefore, by providing a means for preventing the spontaneously emitted light from re-entry into the laser medium, the ratio of conversion of energy to the output light is increased and the efficiency can be improved.

DETAILED DESCRIPTION OF THE PREFERRED EMBODIMENT

Figure 1:
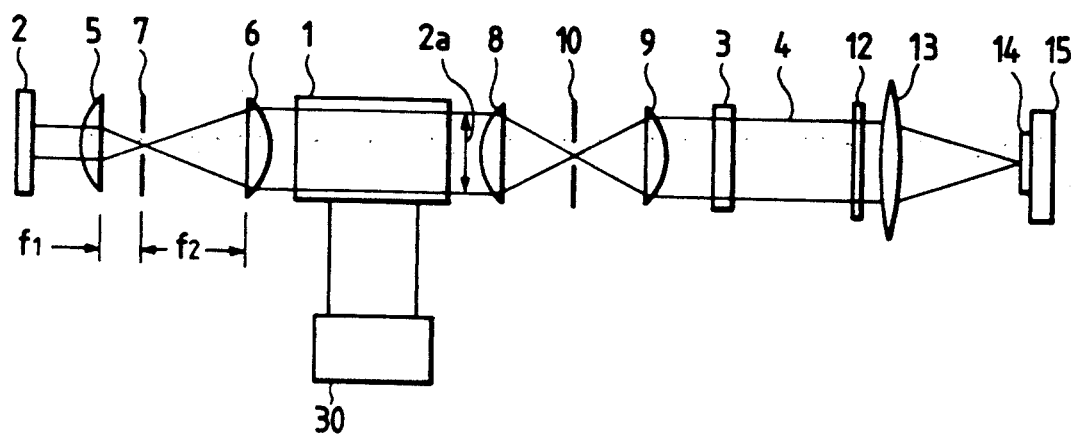
FIG. 1 is a schematic illustration showing the embodiment of the present invention applying to an apparatus for manufacturing of semiconductor.

An embodiment of the present invention applying to an apparatus for manufacturing of semiconductor is shown in FIG. 1. A resonator is composed of a laser medium 1, a whole reflecting mirror 2, and an output mirror 3. The laser medium 1 is excited pulsewise by an exciting means 30, and generates a pulse light. The exciting means excites continuously, but it is possible to oscillate pulsewise by installing an optical switch which intercepts and passes light alternately in the resonator. The numerals 5, 6, 8 and 9 indicate light collecting elements such as a lens, and it is possible to compose the light collecting element with a plurality of lenses for reduction of aberration. Each of pairs of the light collecting elements 5 and 6, and 8 and 9 are so installed as to have nearly a confocal position and $f_1+f_2$ as the distance between lenses. Depending on divergence angle of the laser, there are some cases in which the light collecting elements are installed apart with somewhat shorter distance than the $f_1+f_2$. By installing as described above, a projected parallel beam into the light collecting element keeps parallel condition when it comes out from other light collecting element. As the whole reflecting mirror and the output mirror are parallel mirrors, the parallel beam reflecting back and forth between the whole reflecting mirror 2 and the output mirror 3 repeats theoretically the reflecting many times without changing of the diameter of the beam. At each of the confocal positions of the pairs of the light collecting elements, 5 and 6, and 8 and 9, each of the aperture plates, 7 and 10, having a circular opening is installed. There are two emissions from the laser medium, one is the emission which amplifies the strength of the laser beam by adding the stimulated emitted light to the laser reflecting back and forth and another is the emission which is released spontaneously in all directions. The latter spontaneously emitted light is cut off by the aperture, 7 and 10, because of its poor directivity. The face of the aperture plates, 7 and 10, of the laser medium side has a structure to reflect diffusively, or a structure to absorb the spontaneously emitted light by being painted dark in order to prevent the spontaneously emitted light from re-entry into the laser medium. Accordingly, the spontaneously emitted light does not cause stimulated emission to other excited atoms and molecules by returning to the laser medium portion with reflection at the whole reflecting mirror. Although the spontaneously emitted light is amplified gradually by causing stimulated emission before releasing from the laser medium, its strength is still small and is substantially negligible, hence the amplification of the spontaneously emitted light is prevented by the aperture which is installed outside of the laser medium. The output mirror 3 reflects a part of the projected light and transmits the rest, and the transmitted light is used as the laser light. The transmitted laser light, namely the output light 4, is transmitted through the mask plane for semiconductors 12 and collected by the light collecting lens 13, and is exposed miniaturizingly to the wafer 14 on the fixing plate 15. The length of the laser pulse is such that the oscillation is terminated in a time which is shorter than the $\pi a^2/\lambda c$ from the excitation of the laser medium. If longer than the time described above, the laser beam becomes to have strong interference. The radius of the aperture is so determined as to have at least twice of the radius of the single mode beam. If smaller than the radius described above, the laser beam becomes to have strong interference. The radius can be expressed by the equation of $2f\lambda/\pi a$ where, f is the shorter focal distance of the lenses between the light collecting elements 5 and 6. As enlarging of the diameter of the aperture, the order of the lateral mode is increased gradually and spatial strength of the output light becomes constant.

Figure 2:
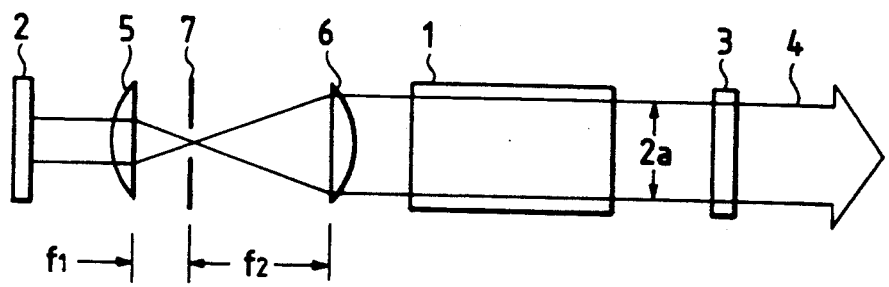
FIG. 2 is a schematic illustration showing the second embodiment of the present invention.
Figure 3:
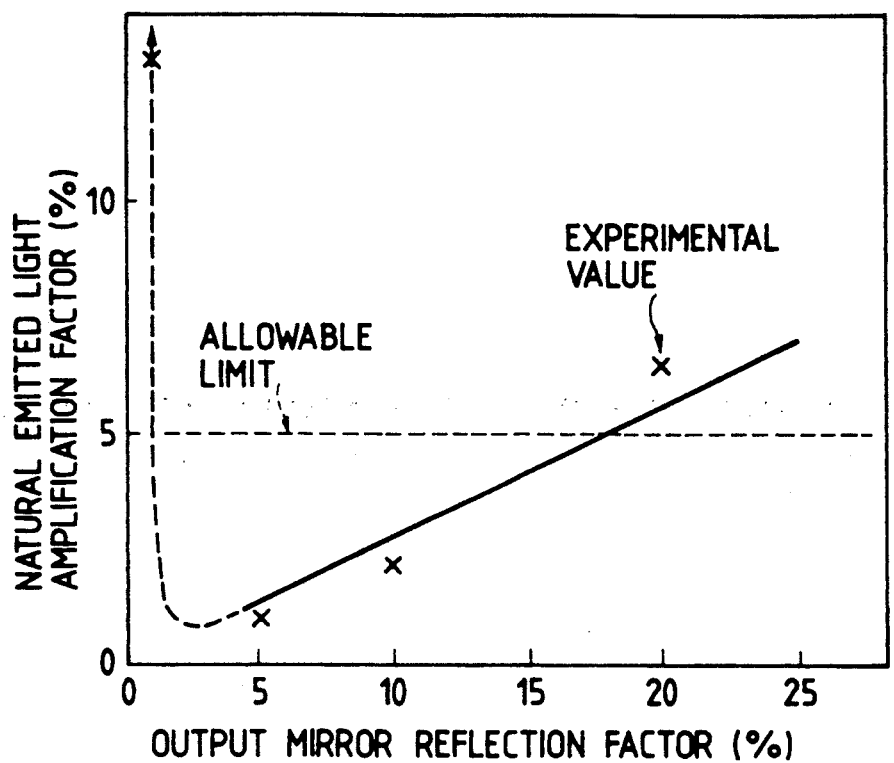
FIG. 3 is a graph showing the relation between the reflecting ratio of the output mirror and the amplifying factor of the spontaneously emitted light.

The second embodiment of the laser oscillator is shown in FIG. 2. The present embodiment makes it possible to omit the aperture system of output side in FIG. 1, namely the light collecting elements 8 and 9 and the aperture 10, in order to shorten the length of the resonator. The result of measurement on the ratio of the output of the amplified spontaneously emitted light to the output of the laser when using a copper vapor laser as the laser oscillator is shown in FIG. 3. Substantially negligible ratio of the amplified spontaneously emitted light is put as $R_0$. The reflectance of the output mirror to make $R_0 = 5\%$ is 18%. Generally speaking, relation of the limiting reflectance $R_0$ with other parameters is given by $R_0 = \rho L\gamma/a$ where, L is length of the resonator, a is the radius of the laser light, $\gamma$ is the angle of aperturing of the aperture optical system, 5, 6 and 7. $\gamma$ is calculated by the equation $\gamma = r_0/f_1$ (refer to FIG. 2 for $r_0$) as $1.6 \times 10^{-3}$. On the other hand, if the reflectance is decreased less than 1%, the spontaneously emitted light becomes not negligible because the strength of the laser itself which reflects back and forth is weakened.

As the length of the resonator can be shortened by the present invention, the focal distance of the light collecting elements 5 and 6 can be elongated in order to suppress the spherical aberration of the lens so as to be small. Also, pulsatory motion of the pulse becomes small by shortening of the length of the resonator and the amplifying factor of the spontaneous emitted light can be suppressed. For instance, the case of diameter of 35 mm with visible light, it becomes about 70 cm. As the laser medium is about 1 m, the time which is necessary for a reflection of back and forth in the resonator is elongated by insertion of two sets of aperture systems, and wave shape of the laser pulse has large pulsatory motion. The period of a cycle of the pulsatory motion is the time which is required for a back and forth motion in the resonator. If there is a portion where the strength of the laser is weak, the spontaneous emitted light is increased and the efficiency is decreased because of reduction of the induced emission at the portion.

In the second embodiment, the means to prevent the spontaneously emitted light from re-entering into the laser medium is also provided as same as the first embodiment at the face of the aperture plate 7 of laser medium side.

Figure 5:
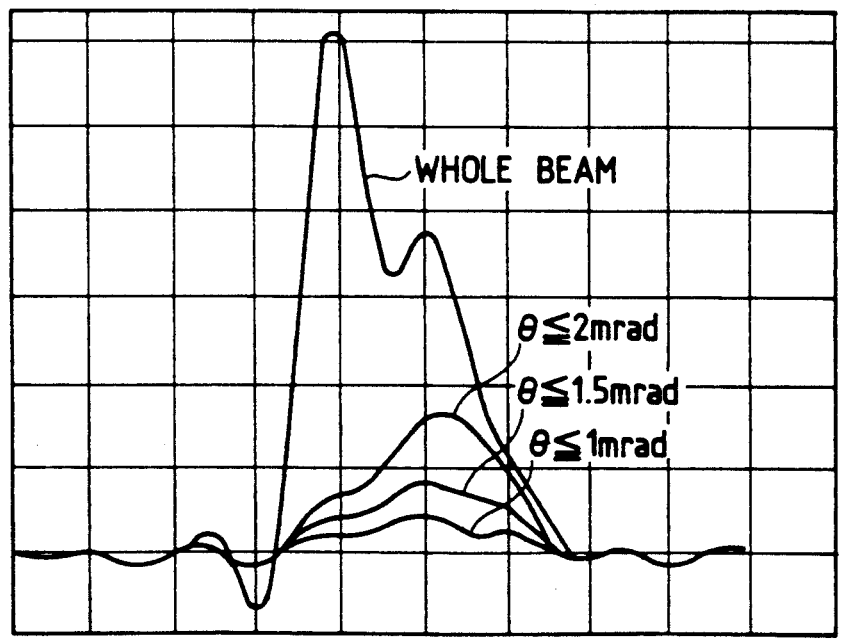
FIG. 5 is a graph showing the output characteristics of the laser oscillator of the prior art.
Figure 4A:
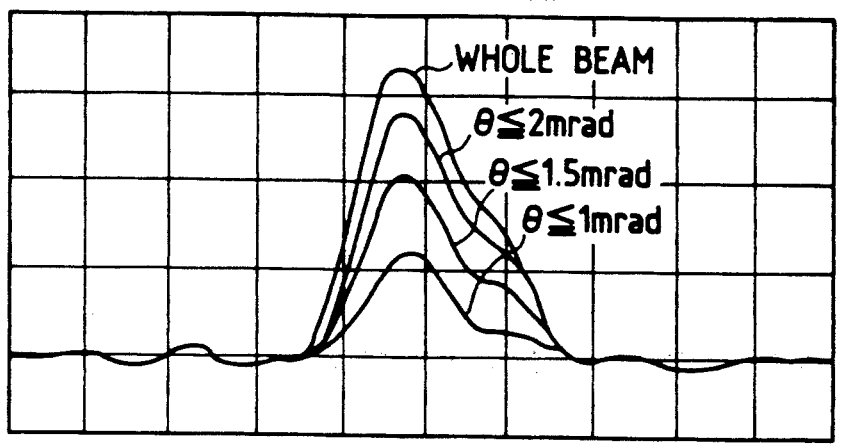
FIG. 4(a)-(c) are graphs showing the output characteristics of the laser oscillator used in the second embodiment of the present invention.
Figure 4B:
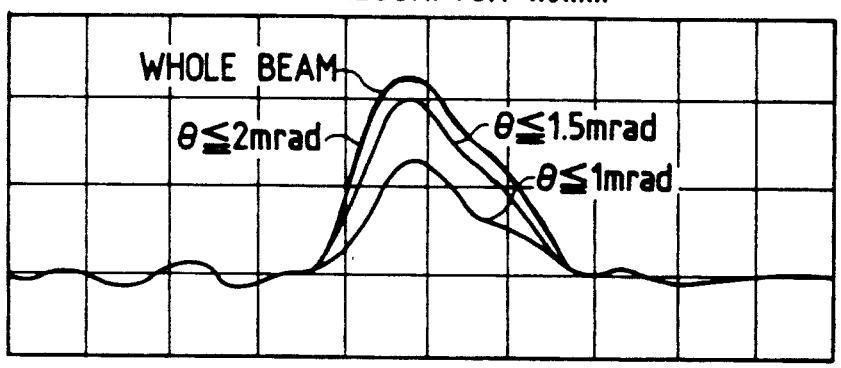
Figure 4C:
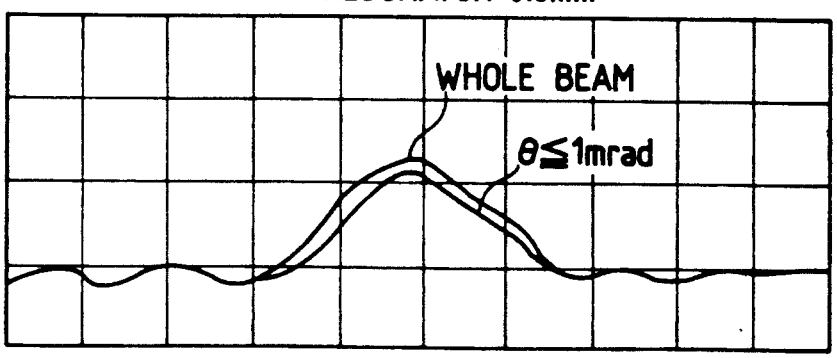

FIG. 4 indicate chronical response of output light in the embodiment which is shown in FIG. 2, and FIG. 5 indicates the response of the output light with the resonator of the prior art 2. The measurement shown in FIG. 4 and 5 were performed by measurement of the strength of output light which is transmitted through the optical system which is composed of light collecting elements having focal distance of f and aperture plates having diameter d of the aperture which are installed at the focal positions of the light collecting elements. The divergence angle $\theta$ in FIG. 4 and 5 is defined as d/f. Therefore, the divergence angle $\theta \leq 1$ mrad indicates the strength of output light having the divergence angle of the beam of at most 1 mrad among the collected output light. In FIG. 4(a)–(c) and 5, the chronically constant directivity means that the divergence of the beam is constant chronically. For establishment of the condition, the ratio of the strength of the output wave shape at each divergence angle to the strength of the output wave shape of the whole beam should be constant at each moment. The embodiment shown in FIG. 2 indicates that, although the diameter of the pin hole of the aperture plate 7 is changed as 0.6 mm, 1.0 mm, and 1.5 mm, the ratio of the strength of the output wave shape at each divergence angles to the strength of the output wave shape of the whole beam is almost constant irrelevant to the change of time. While, the prior art shown in FIG. 5 indicates that, although the ratio of strength between each of divergence angles of $\theta = 1$ mrad, 1.5 mrad, and 2.0 mrad showing in FIG. 5 are constant, the ratio of strength of the output wave shape at each divergence angles to the strength of the output wave shape of the whole beam is changed chronically. This means that the output light having different ratio of strength from the output light having at most 2 mrad of divergence angle exists at divergence angle of at least 2 mrad. Therefore, the divergence of the beam of the output light is not constant chronically. As explained above, the present embodiment indicates experimentally that the directivity becomes almost constant chronically.

Figure 6:
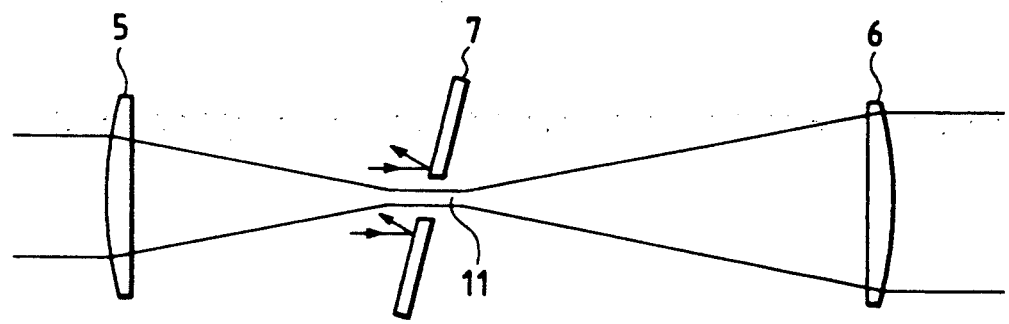
FIG. 6 is a schematic illustration showing the embodiment of a method of preventing the unnecessary spontaneously emitted light from re-entering into the amplifier.

FIG. 6 shows the second embodiment which prevents the spontaneous emitted light from re-entering to the laser medium. When a black plate having high absorbing coefficient is used as an aperture plate it is damaged thermally because of small diameter of the beam. Even if the light is made to be scattered, the light which is cut off by the aperture plate becomes the light having a nearly point light source at around its focal position, and the light re-enters into the laser medium, hence, the effect of cutting off by the aperture plate is small. Accordingly, a plate having a relatively smooth surface is installed slantwise in order to make the light not reenter into the laser medium side. Further, the slanting circular opening looks like an oval shape when it is seen from the direction of the axis of the laser light. Therefore, an opening 11 which makes the circular opening look a circular shape is installed.

Figure 7:
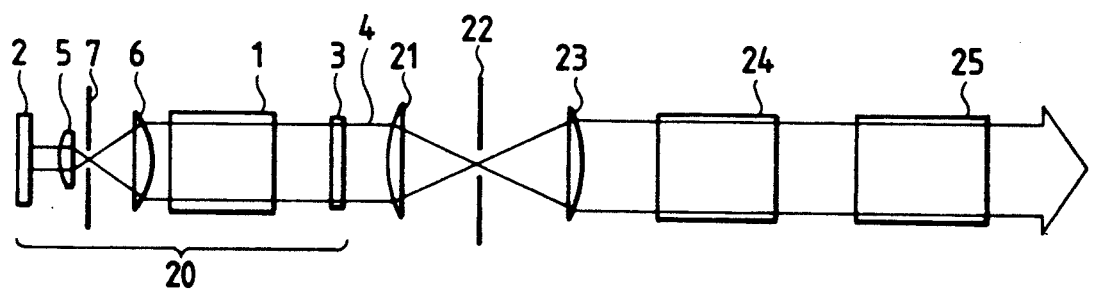
FIG. 7 is a schematic illustration showing the embodiment of the present invention applying to the laser oscillator comprising a resonator and an amplifier.

FIG. 7 indicates an embodiment in which the present invention is applied to a laser oscillator comprising a resonator and an amplifier. In the embodiment, the spontaneously emitted light from the amplifier is made not to return to the amplifier. That is, in the present embodiment, a laser light 4 having constant directivity which is oscillated from the resonator 20 is amplified by the amplifiers 24 and 25 in order to increase the output.

In the present embodiment described above, among the spontaneous emitted light from the amplifiers 24 and 25, the light which is emitted to the resonator 20 side is reflected by the whole reflecting mirror 2 and returns to the amplifiers 24 and 25 again. As the aperture systems 5, 6 and 7 of the oscillator perform an effect to eliminate the spontaneously emitted light from the amplifier, a short pulse laser having constant directivity can be oscillated by the laser system. And the aperture systems 21, 22 and 23 have effects to prevent the spontaneously emitted light from being amplified by the laser medium 1 of the oscillator 20 and to prevent the spontaneous emitted light from returning to the amplifier by partial reflection by the output mirror 3 of the oscillator 20.

As explained above, the present invention has following effects.

The present invention is able to provide a laser oscillator having nearly constant directivity chronically.

Also, the present invention is able to provide a laser oscillator having a beam of nearly constant strength spatially.

Further, the present invention is able to provide a laser oscillator which oscillates effectively.

And, pulse laser oscillators such as an excimer laser and a copper vapor laser which oscillate the laser having almost constant directivity chronically are provided.

What is claimed is:

1. A laser oscillator comprising
a resonator having a whole reflecting mirror and an output mirror which are installed with an interval having a laser medium between, and
a means to excite the laser medium;
characterized in having
an optical system for selecting directivity of light from the resonator between said whole reflecting mirror and said laser medium.

2. A laser oscillator comprising
a resonator having a whole reflecting mirror and an output mirror which are installed with an interval having a laser medium between, and
a means to excite the laser medium; characterized in having
a means for making only spontaneously emitted light having a preferred directivity which is emitted from said laser medium and reflected by said whole reflecting mirror to re-enter said laser medium.

3. A laser oscillator comprising
a resonator having a whole reflecting mirror and an output mirror which are installed with an interval having a laser medium between, and
a means to excite the laser medium;
characterized in installing
two light collecting elements between said whole reflecting mirror and said laser medium, and
an aperture mechanism at nearly confocal position of said light collecting elements.

4. A laser oscillator comprising
a resonator having a whole reflecting mirror and an output mirror which are installed with an interval having a laser medium between, and
a means to excite the laser medium;
characterized in installing
two light collecting elements and
a circular aperture at nearly confocal position of said light collecting elements
in at least an interval of between said laser medium and said whole reflecting mirror and between said laser medium and said output mirror, and in having
a radius of said aperture at least twice of radius of an image which is focused on said aperture when a single mode beam is formed in said resonator.

5. A laser oscillator comprising
a resonator having a whole reflecting mirror and an output mirror which are installed with an interval having a laser medium between, and
a means to excite the laser medium;
characterized in installing
two light collecting elements and
an aperture mechanism at nearly confocal position of said light collecting element
in at least an interval of between said laser medium and said whole reflecting mirror and between said laser medium and said output mirror, and in installing
said aperture mechanism slantwise to a laser axis which is formed in said resonator.

6. A laser oscillator comprising
a resonator having a whole reflecting mirror and an output mirror which are installed with an interval having a laser medium between, and
a means to excite the laser medium;
characterized in installing
two light collecting elements and
an aperture mechanism at nearly confocal position of said light collecting elements
in at least an interval between said laser medium and said whole reflecting mirror and between said laser medium and said output mirror, and in having
a reflecting coefficient of said output mirror of at least 1%, and
an amplifying coefficient of unnecessary spontaneously emitted light, which is emitted from said laser medium and reflected by said output mirror, of at most a desired percentage.

7. A laser oscillator as claimed in claim 6, wherein said oscillator is a copper vapor laser and said desired percentage is 18%.

8. A laser oscillator comprising
a resonator having a whole reflecting mirror and an output mirror which are installed with an interval having a laser medium between,
a means to excite the laser medium, and
an amplifier which amplifies output light from the resonator;
characterized in installing
two light collecting elements between said whole reflecting mirror and said laser medium, and
an aperture mechanism at nearly confocal position of said light collecting elements.

9. A laser oscillator comprising
a resonator having a whole reflecting mirror and an output mirror which are installed with an interval having a laser medium which is able to generate laser continuously between, and
a means to excite the laser medium;
characterized in having
a pulsatory excitation means of said laser medium, and
a means between said whole reflecting mirror and said laser medium for selecting spontaneously emitted light which forms good directivity light in said resonator from the spontaneously emitted light which are generated from said laser medium.

10. A laser oscillator comprising
a resonator having a whole reflecting mirror and an output mirror which are installed with an interval having a laser medium between, and
a means to excite the laser medium;
characterized in having
a means for terminating of excitation of said laser medium before a laser which is generated in said resonator forms transverse mode, and
a means between said whole reflecting mirror and said laser medium for selecting spontaneously emitted light which forms light in said resonator from the spontaneously emitted light which are generated from said laser medium.

11. A laser oscillator comprising
a resonator having a whole reflecting mirror and an output mirror which are installed with an interval having a laser medium between, and
a means to excite the laser medium;
characterized in installing
a means for terminating of excitation of said laser medium before a laser which is generated in said resonator forms transverse mode, and
two light collecting elements between said whole reflecting mirror and said laser medium and
a aperture mechanism at nearly confocal position of said light collecting elements.

12. A laser oscillator comprising
a resonator having a whole reflecting mirror and an output mirror which are installed with an interval having a laser medium between, and
a means to excite the laser medium;
characterized in having
a means for termination of excitation of said laser medium before a laser which is generated in said resonator forms transverse mode, and
a means to generate laser light having almost constant directivity chronically.

13. A laser oscillator comprising
a resonator having a whole reflecting mirror and an output mirror which are installed with an interval having a laser medium between, and
a means to excite the laser medium;
characterized in having
a means for termination of excitation of said laser medium before a laser which is generated in said resonator forms transverse mode, and
a means to generate laser light having almost constant strength spatially.

14. A laser oscillator comprising
a resonator having a whole reflecting mirror and an output mirror which are installed with an interval having a laser medium between, and
a means to excite the laser medium;
characterized in having
a means to generate laser light having almost constant directivity chronically and output of Watt order.

15. A laser oscillator comprising
a resonator having a whole reflecting mirror and an output mirror which are installed with an interval having a laser medium between;
characterized in having
a means between said whole reflecting mirror and said laser medium for selecting spontaneously emitted light which forms parallel light in said resonator from the spontaneously emitted light which are generated from said laser medium.

16. A laser oscillator comprising
a resonator having a whole reflecting mirror and an output mirror which are installed with an interval having a laser medium between;
characterized in installing
two light collecting elements between said whole reflecting mirror and said laser medium, and
an aperture mechanism at nearly confocal position of said light collecting elements.

17. A laser oscillator comprising
a resonator having a whole reflecting mirror and an output mirror which are installed with an interval having a laser medium between;
characterized in installing
two light collecting elements and
a circular aperture at nearly confocal position of said light collecting elements
in at least an interval of between said laser medium and said whole reflecting mirror and between said laser medium and said output mirror, and in having
a radius of said aperture at least twice of radius of an image which is focused on said aperture when a single mode beam is formed in said resonator.

18. A laser oscillator comprising
a resonator having a whole reflecting mirror and an output mirror which are installed with an interval having a laser medium between;
characterized in installing
two light collecting elements and
an aperture mechanism at nearly confocal position of said light collecting elements
in at least an interval of between said laser medium and said whole reflecting mirror and between said laser medium and said output mirror, and in installing
said aperture mechanism slantwise to a laser axis which is formed in said resonator.

19. An apparatus for semiconductor fabrication comprising
a laser oscillator, and
a means for irradiating of laser light from said laser oscillator to a mask;
characterized in having
a means for making said laser oscillator generate the laser light having almost constant directivity chronically and no interference.

* * * * *